United States Patent [19]

Stigliani et al.

[11] 4,133,945
[45] Jan. 9, 1979

[54] PROCESS FOR THE PREPARATION OF CYCLIZED POLYDIENES

[75] Inventors: Giuseppe Stigliani, Busto Arsizio (Varese); Alessandro Giudici, Castellanza (Varese); Franco Ferré, Gorla Minore (Varese), all of Italy

[73] Assignee: Societa' Italiana Resine S.I.R. S.p.A., Milan, Italy

[21] Appl. No.: 870,147

[22] Filed: Jan. 17, 1978

[30] Foreign Application Priority Data

Jan. 17, 1977 [IT] Italy ............................. 19352 A/77

[51] Int. Cl.² .............................................. C08F 4/52
[52] U.S. Cl. ..................................... 526/189; 526/185
[58] Field of Search ............................... 526/185, 189

[56] References Cited
U.S. PATENT DOCUMENTS

| 3,123,592 | 3/1964 | Gasparoni et al. | 526/185 |
| 3,349,065 | 10/1967 | Kennedy | 526/185 |
| 3,562,804 | 2/1971 | Powers | 526/185 |
| 3,721,661 | 3/1973 | Susa | 526/185 |

FOREIGN PATENT DOCUMENTS 316697  5/1969  U.S.S.R. ................... 526/185

Primary Examiner—William F. Hamrock
Attorney, Agent, or Firm—Sughrue, Rothwell, Mion, Zinn and Macpeak

[57] ABSTRACT

Cyclized polydienes devoid of crosslinked fractions are prepared by polymerizing conjugated diolefins in solution in a solvent consisting of a mixture of saturated hydrocarbons with 20–95% by weight, with respect to the mixture, of chlorinated saturated hydrocarbons, in the presence of from 0.1 to 10 moles for each 100 moles of diolefins, of a catalyst of the formula $R_nAl\ Cl_{3-n}$, where R is an alkyl radical with 1–6 carbon atoms and n is from 1 to 1.5.

These cyclized polydienes can be used in coating formulations.

17 Claims, 1 Drawing Figure

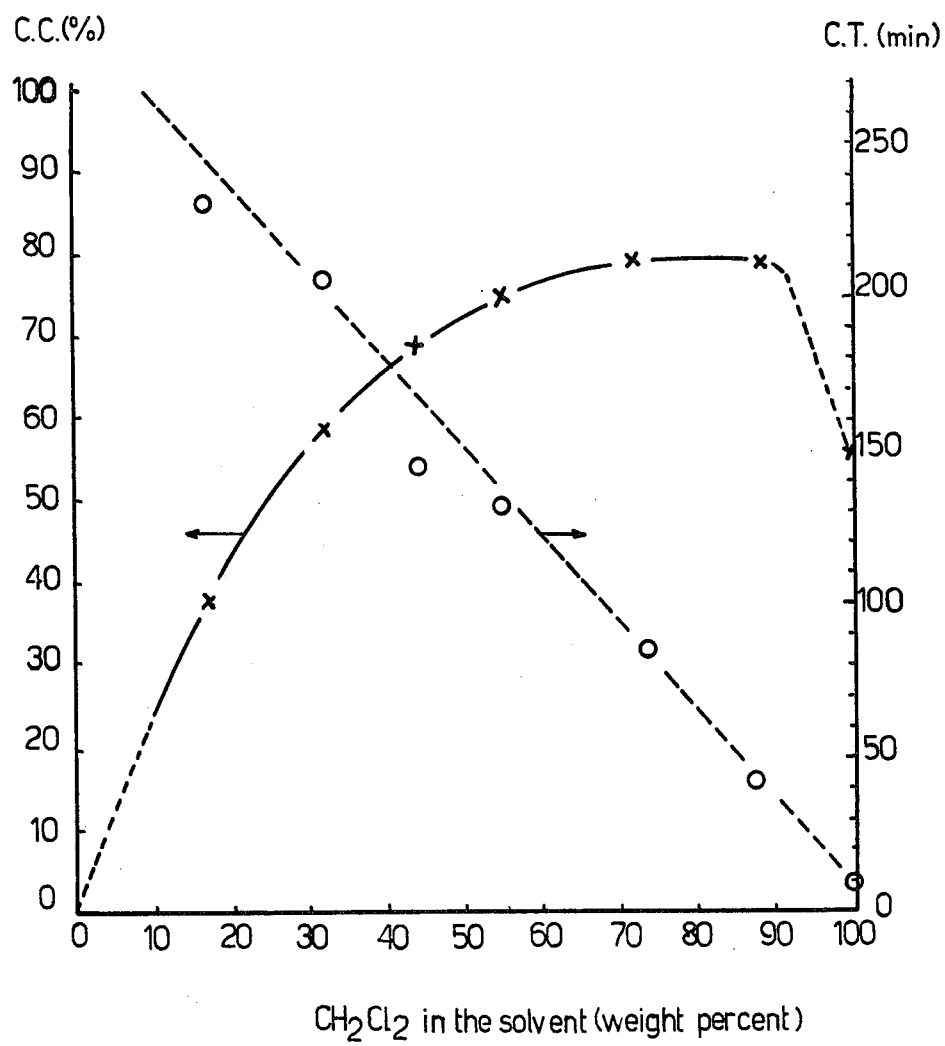

PROCESS FOR THE PREPARATION OF CYCLIZED POLYDIENES

The present invention relates to a process for the preparation of cyclized polydienes, devoid of insoluble crosslinked fractions, by means of polymerization of conjugated diolefins in solution and in the presence of cationic catalysts.

The cyclized polydienes currently used and known as "cyclized rubber" or "cyclorubber" are non-crosslinked amorphous polymers, of various structure, having molecular weights of from 2,000 to 10,000 and are characterized in that they contain only a portion (generally from 50 to 90%) of the double bonds initially present in their basic structural unit, the remaining portion having reacted to give rise to cyclic structures. These cyclized polydienes, which usually have a softening point of from 60 to 160° C., currently have particular use in the field of rubber-metal adhesives and in that of varnishes and of coatings in general, given their capacity to resist acids and other corrosive agents.

According to the known art, cyclized rubbers are prepared by reaction of a natural rubber in the presence of cationic catalytic systems.

More particularly the reaction is carried out by dissolving the rubber in a hydrocarbon solvent and the resulting solution, which is highly viscous, is heated in the presence of strong organic acids, or mineral acids, or other Lewis acids, such as halides of amphoteric metals or their derivatives (for example tetrachloride and tetrabromide of tin, antimony pentachloride and titanium tetrachloride), or of Friedel-Crafts catalysts (for example boron trifluoride, aluminium trichloride or tin chloride).

In this manner a partially cyclized product is produced in that it contains only a fraction of the double bonds present in the natural rubber subjected to treatment. During the reaction a decrease also occurs in the molecular weight which falls from an initial value of 200,000–300,000 to 2,000 to 10,000 in the cyclized product.

Synthetic rubbers such as polybutadiene and polyisoprene may be treated in the same way.

This procedure has notable disadvantages of an economic and operative nature, such as the high cost of the starting material, the long periods necessary for the dissolution of the rubber and the need to operate in very dilute solutions, since the high molecular weight of the starting polymer confers a very high viscosity on the solution, even at concentrations of the order of 10% by weight.

Finally the high viscosity of the solutions brings about a whole series of problems, such as difficulties of homogenization with the catalyst, high head losses in the pipework, a difficulty in heat exchange and others. Processes proposed as alternatives such as, for example, those which involve subjecting the rubber to the action of a cyclizing agent, either in aqueous dispersion or in the solid state (for example by mixing in a calender), have not completely resolved the above-mentioned problems and moreover produce others, while severely limiting the choice of the catalytic system.

The greatest disadvantage of processes using rubber as the starting material, consists of the partial crosslinking of the polymer, with resultant gelling and formation of fractions insoluble in the usual organic solvents, which must be removed before the drying of the finished product.

The expedients proposed to reduce this undesirable phenomenon have not until now produced entirely satisfactory results.

It has now been found that it is possible to obtain products similar to cyclized rubber by direct polymerization of conjugated diolefins in the presence of cationic catalysts, thus obtaining non-negligible advantages with respect to the processes described above, due both to the lower cost of the starting material (diolefin instead of its polymer), and the ease of carrying out the process, since the dissolution of the rubber and the treatment of highly viscous solutions are avoided.

The mixture obtained after polymerization is fluid, although the final content of the cyclized polymer is higher than in the case of solution cyclization in which rubber is used as the starting material.

Moreover, according to the process of the present invention it is possible to obtain, with high yield with respect to the monomer, cyclized polymers which are not crosslinked, and therefore perfectly soluble in toluene, xylene and in other commonly used solvents.

The cationic polymerization of conjugated diolefins to obtain solid cyclized polymers has not until now been applied on an industrial scale since, by using the conventional methods, non-negligible amounts of gelled polymer are obtained and the phenomenon is accentuated in high conversions, as described by P. H. Plesch in "The Chemistry of Cationic Polymerization", Pergamon Press, 1963 and by I. P. Kennedy in "Cationic Polymerization of Olefins: A Critical Inventory" Wiley-Interscience, 1975.

Thus, the invention provides a process for the preparation of cyclized polydienes devoid of crosslinked fractions, characterized by polymerizing one or more conjugated diolefins in solution in a solvent consisting of a mixture of one or more saturated aliphatic or cycloaliphatic hydrocarbons with one or more chlorinated saturated aliphatic or cycloaliphatic hydrocarbons, said chlorinated hydrocarbons being present in said solvent in an amount of from 20 to 95% by weight, in the presence of from 0.1 to 10 moles for each 100 moles of diolefins, of a catalyst of the formula $R_n Al Cl_{3-n}$, where R is an alkyl radical with from 1 to 6 carbon atoms and n is from 1 to 1.5, interrupting the polymerization before the critical conversion, corresponding to the beginning of the formation of crosslinked fractions, is reached, and recovering the cyclized polydienes thus obtained from the reaction medium.

In the polymerization of conjugated diolefins in the presence of an aluminium halide or alkyl halide to give partially cyclized solid polydienes, there is a conversion value for the diolefins (critical conversion) beyond which the undesirable phenomenon of crosslinking starts to be manifested.

When working in solution in aliphatic solvents this critical conversion value is near zero and the reaction proceeds very slowly, as will be shown in the following experimental examples.

When the process is carried out in solution in chlorinated aliphatic solvents, the critical conversion value is relatively high, but the reaction duration is very short, of the order of a few minutes or even of a few seconds. Therefore, it is extremely difficult to operate in conditions which are easily reproducible and to interrupt the reaction before the critical value is reached.

Both the crosslinking phenomenon, connected to the configuration of the macromolecules in solution, and the kinetics which is affected by the polarity of the reaction medium, depend therefore on the solvent medium.

The present invention is based essentially on the use of a mixed solvent medium containing both saturated hydrocarbons and chlorinated saturated hydrocarbons, and on the fact that by suitably varying the amount of chlorinated hydrocarbon in said solvent medium, it is possible to vary both the kinetics and the critical conversion value, thus obtaining in economically advantageous conditions products devoid of crosslinked fractions.

More particularly, by increasing the percentage of chlorinated saturated hydrocarbon in the solvent medium, one observes an increase in the polymerization speed and a raising of the critical conversion value, which generally reaches higher values than those obtainable by using the chlorinated hydrocarbons alone.

In practice, for a given diene monomer, optimum polymerization conditions (which enable one to obtain, in a reproducible manner, a completely soluble product, with a conversion of at least 50% and a reaction time of the order of 40–90 minutes) are obtained by selecting the components of the solvent medium as well as the ratio between these components.

The kinetics may also be slowed down or accelerated by varying other parameters such as the polymerization temperature, the monomer/catalyst molar ratio and the quantity of possible activating substances.

In particular the reaction speed increases with increase in temperature and, within the limits specified later, with an increase in the quantity of activating substances; it lessens on the contrary, as the monomer/catalyst ratio increases. Said parameters have a negligible influence on the critical conversion.

The catalyst of the present invention is completely soluble in saturated hydrocarbons, in chlorinated saturated hydrocarbons and in mixtures of these; it is therefore easily measured and the reaction mixture is homogeneous up to the critical conversion value.

Moreover, when using the said catalyst according to the process of the invention, the polymers thus obtained typically have a degree of unsaturation of from 45 to 55%, i.e. the best range for the use to which these polymers are intended.

Other catalysts, such as aluminium trichloride and the boron trifluoride ethyl ether complex, are not suitable for the purpose.

Aluminium trichloride is soluble only in chlorinated or at least very polar solvents and always in very small quantities.

Moreover, when using aluminium trichloride, the reaction progress is difficult to control because of the fast kinetics, and the products obtained are partially crosslinked.

With boron trifluoride etherate, which is soluble in mixtures of saturated hydrocarbons and chlorinated saturated hydrocarbons, it is possible to obtain non-crosslinked products under the conditions of the present invention. The yields are, however, modest, the products obtained are liquid or waxy and the cyclization percentage is noticeably lower (60–75% of residual unsaturation).

The conjugated diolefins generally have from 4 to 6 carbon atoms and are preferably chosen from butadiene and isoprene. It is also possible to use a plurality of different olefins, in which case copolymers are obtained having characteristics intermediate those of homopolymers obtainable under the same reaction conditions, starting from the single monomers.

The diolefins are generally used in an amount not exceeding 8 moles, or even 6 moles for every liter of solvent; the best results are generally obtained by feeding in from 1 to 4.5 moles of diolefin for every liter of solvent.

As has already been stated, the solvent consists of one or more saturated hydrocarbons and one or more chlorinated saturated hydrocarbons.

The saturated hydrocarbons generally have from 4 to 12 carbon atoms, and preferably from 5 to 8, and may be linear, branched or cyclic.

The preferred chlorinated saturated hydrocarbons are the mono- and polychlorinated methane and ethane, especially methyl and ethyl chlorides and methylene chloride.

The objects of the present invention are attained by using from 20 to 95 parts by weight of chlorinated saturated hydrocarbons for every 100 parts by weight of the solvent. With values below 20 parts by weight the polymerization times become excessively high and the value of the critical conversion is too low, which results in undesirable crosslinking phenomena. Values above 95 parts by weight lead to an excessive increase in polymerization speed. The control of the reaction progress becomes very difficult.

The best results are achieved when using from 40 to 80 parts by weight of chlorinated saturated hydrocarbon for every 100 parts by weight of the solvent. In each case the choice of the optimal value is linked to the particular hydrocarbons chosen, the monomer subjected to polymerization and to the parameters already mentioned.

The catalysts used in the process of the present invention are those definable by means of the formula:

$$R_n \, Al \, Cl_{3-n}$$

R being an alkyl radical containing from 1 to 6 carbon atoms and preferably from 2 to 4 carbon atoms and n being a number variable from 1 to 1.5.

The catalyst preferably consists of a compound of the above formula.

It may also be possible to use mixtures of alkylaluminium with alkylaluminium chlorides and/or aluminium chloride in such proportions that the ratios between chlorine atoms, aluminium atoms and alkyl radicals comply with the above formula.

The preferred catalysts are ethylaluminium sesquichloride and above all monoethylaluminium dichloride.

The catalyst may be used in an amount of from 0.1 to 10 moles for every 100 moles of conjugated diolefin, the preferred values being generally from 0.5 to 5 moles for every 100 moles of the said diolefin.

The reaction temperature is generally from −80° to 70° C., and preferably from 0° to 40° C.

Traces of humidity, or of other polar compounds which, in the presence of the catalyst can promote the formation of protons (for example hydrogen halides and alcohols) have a favourable influence on the progress of the polymerization.

It is therefore preferable to operate in a solvent medium which contains from 5 to 100 ppm by weight of said polar compounds, the choice of the most suitable value, within the said range, being linked to the quantity of catalyst used and to the reaction speed at which it is desired to operate. Larger amounts of water, or of the other polar substances mentioned above, are not desired in that they lead to gradual de-activation of the catalyst.

The polymerization reaction may be carried out batch-wise or continuously.

In the first case there may be fed successively into the reactor: part of the solvent, the diolefin and a solution of the catalyst in the solvent, or solutions of the diolefin and of the catalyst in the solvent may be added at the same time to the reactor which already contains part of the solvent.

In the second case the solutions of the catalyst and of the diolefin, in the required ratio, are fed continuously into the reactor.

Whichever method is used, it is useful to dissolve the catalyst and the diolefin separately in the solvent, or in the constituents of the solvent and to feed the solutions thus obtained into the polymerization reactor.

The reaction times may vary from a few minutes to 2-3 hours, depending on the selected conditions.

In general it is preferable to operate in conditions in which, in 40-90 minutes, conversions greater than 50% and as near as possible to the critical conversion, but slighly below this value, are obtained.

In the polymerization of butadiene and isoprene, conversions of from 70 to 80% with respect to the diolefin fed in, may be reached.

The polymerization reaction may be interrupted at the desired point by the addition of compounds capable of rendering the catalyst inactive, such as alcohols, esters of polyoxyethylene sorbitol with fatty acids, and phosphates of polyoxyethylene alkyl (or aryl) ethers. In general methanol and isopropanol are used.

The cyclized polydiene may be separated from the reaction mixture by the addition of a non-solvent, such as methanol, isopropanol or another alcohol.

By operating according to the present invention, amorphous polymers are obtained, in the form of a white powder, in which the residual unsaturation is generally from 40 to 60%, more often of the order of 45–55%, the remainder consisting of cyclized units. The microstructure of the residual unsaturation is usually of the 1,4-trans type.

The microstructure for polybutadienes is typically as follows: 1,4-cis 8–13%; 1,4 trans 68–75%, vinyl 15–23%. The microstructure of the unsaturated units for polyisoprenes is typically as follows: 1,4-trans 90–95%; 3,4 1–5%; vinyl 3–6%.

In every case the said cyclized polydienes are devoid of crosslinked fractions, in that with toluene, xylene and other compatible solvents, they produce limpid solutions, devoid of material which can be filtered off.

EXAMPLE 1

The apparatus used consists of a 1.5 liter, four necked distillation flask (A) fitted with a magnetic stirrer, a dropping funnel and with a stainless steel sampling capillary, by which it is possible to take out samples through a tap.

The said distillation flask is connected through a syphon to a 1 liter distillation flask (B) with three necks.

The apparatus is purged with nitrogen and immersed in a thermostatically controlled bath at 23° C.

Into distillation flask B there are then introduced, under a nitrogen atmosphere, 351 ml (465 g) of methylene chloride, previously dried on 3A molecular sieves and distilled over triethylaluminium, and 407 ml (278 g) of technical heptane (boiling range 94–98° C.) previously dried on 3A molecular sieves, distilled over sodium-potassium alloy and then mixed with heptane saturated with water, in such proportions as to obtain a humidity content equal to 22 ppm by weight (humidity of the mixture: 7 ppm).

Into the dropping funnel are introduced 120 ml of a solution obtained by dissolving 2.73 g of ethyaluminium dichloride in 94g of heptane.

80 ml of the solvent medium are transferred from the distillation flask B to distillation flask A through the syphon. 117 g of butadiene, previously dried on molecular sieves and distilled over triethylaluminium, are then dissolved in distillation flask B.

The contents of the dropping funnel and the contents of distillation flask B are transferred simultaneously into distillation flask A, under agitation and the duration of the addition is equal to 5 minutes.

After 45 minutes from the completion of the addition, the reaction solution is transferred to a beaker containing 1.5 liters of methanol, in which there is dissolved 0.5 g of 2,6-di-tert-butyl-4-methyl phenol.

The precipitate is separated by decantation, washed with another 500 ml of methanol, filtered, dried in a vacuum oven at 60° C. for 10 hours and finally weighed. 46.9 g (40.0% conversion) are obtained of a powdery white solid, completely soluble in toluene, and which is amorphous under X-ray examination.

NMR analysis shows that the residual unsaturation is 48% of the theoretical value (calculated on the non-cyclized polybutadiene).

The microstructure determined by IR and NMR analysis is as follows: 1,4-cis 12.5%; 1,4-trans 68.5%, vinyl 19.0%.

The said cyclized polybutadiene has a softening temperature of 125° C., determined by thermomechanical analysis.

EXAMPLE 2 (comparative)

This test is carried out as in Example 1, the polymerization being interrupted after 150 minutes.

The conversion is 82.4% and the cyclized polybutadiene thus obtained is only partially soluble in toluene (69%) and under thermo mechanical analysis does not show variations in state or viscosity when the temperature is raised to 300° C.

EXAMPLES 3–10

These tests are carried out with the apparatus and under the conditions of Example 1, the composition of the heptane-methylene chloride solvent medium being varied.

In each test samples are taken from the reaction mixture at regular intervals and the degree of conversion and the percentage solubility in toluene are determined on each sample.

The conversion and reaction time relative to the last sampling, for which the solubility of the sample in toluene is total, are shown in Table 1.

Beyond these times and conversions, shown respectively as critical time (C.T.) and as critical conversion (C.C.) the samples taken are only partially soluble in toluene. The same data are shown in the diagram of the accompanying drawing.

Tests 3 and 10 carried out respectively in heptane alone and in methylene chloride alone as the solvent medium, are recorded by way of comparison. Test 4 is also comparative.

In particular the results of the test in heptane alone are purely approximate in that in no case has it been possible to obtain completely soluble products with this solvent.

In Table 1 are also recorded the $CH_2Cl_2$ content of the solvent medium, the softening temperature of the cyclized polybutadiene (s.T.) as well as the fraction of the said polymer soluble in toluene.

EXAMPLE 11

This test is carried out as in Example 1 with a reaction temperature of 0° C. After 180 minutes, with a 54.1% conversion a cyclized polybutadiene, soluble in toluene, having a residual unsaturation percentage of 52% and a softening temperature of 85° C. is obtained.

The microstructure is as follows: 1,4-cis 12%, 1,4 trans 70%, vinyl 18%.

Table 1

| Example | $CH_2Cl_2$ (% by weight) | C.T. (min) | C.C. (%) | s.T. (° C) | Fraction soluble in toluene (% weight) |
|---|---|---|---|---|---|
| 3 | 0 | 510 | 10.0 | – | 80 |
| 4 | 17 | 230 | 37.5 | 103 | 100 |
| 5 | 32 | 205 | 58.8 | – | 100 |
| 6 | 44 | 145 | 69.4 | 138 | 100 |
| 7 | 55 | 130 | 75.3 | 157 | 100 |
| 8 | 74 | 85 | 80.0 | 153 | 100 |
| 9 | 88 | 43 | 79.4 | – | 100 |
| 10 | 100 | 10 | 55.0 | 160 | 100 |

EXAMPLES 12-14

These tests are carried out as in Example 1 using three different butadiene/ethylaluminium dichloride (Bd/Al) ratios.

The results are recorded in Table 2.

The cyclized polybutadiene obtained in the three tests is completely soluble in toluene.

Table 2

| Example | Bd/Al (moles/moles) | Time (min) | Conversion (%) | Residual unsaturation (%) | S.T. (° C) |
|---|---|---|---|---|---|
| 12 | 100 | 50 | 43.5 | 48 | 123 |
| 13 | 50 | 50 | 55.3 | 46 | 125 |
| 14 | 25 | 50 | 65.1 | 45 | — |

EXAMPLES 15-17

These tests are carried out as in Example 1 using, jointly with the methylene chloride, various aliphatic hydrocarbons in various ratios.

N-pentane is used in Examples 15 and 16, and petroleum ether (boiling range 30–40° C.) in Example 17.

The results are recorded in Table 3.

The cyclized polybutadienes obtained are completely soluble in toluene.

Table 3

| Example | $CH_2Cl_2$ (% by weight) | Time (min) | Conversion (%) |
|---|---|---|---|
| 15 | 58 | 63 | 40.1 |
| 16 | 75 | 62 | 53.0 |
| 17 | 58 | 50 | 35.3 |

EXAMPLE 18

This test is carried out as Example 1 using ethylaluminium sesquichloride ($Al_2Et_3Cl_3$) as a catalyst in a quantity corresponding to a butadiene/$Al_2Et_3Cl_3$ molar ratio of 28:1.

After 160 minutes and with a 40% conversion, a powdery white polymer completely soluble in toluene is obtained having a residual unsaturation of 55% and a softening temperature of 97° C.

The microstructure is as follows: 1,4-cis 8%; 1,4-trans 71.5%; vinyl 20.5%.

EXAMPLE 19 (COMPARATIVE)

In this test previously distilled boron trifluoride etherate ($BF_3 \cdot Et_2O$) is used as a catalyst, in a quantity corresponding to a butadiene/$BF_3.Et_2O$ molar ratio of 56:1. The solvent medium consists of methylene chloride alone.

The other conditions and methods of operation are those described in Example 1.

After 150 minutes, with a 21% conversion, a waxy polymer completely soluble in toluene is obtained, having a residual unsaturation of 68%.

The microstructure is as follows: 1,4-cis 3.5%; 1,4-trans 78.5%; vinyl 18%.

EXAMPLE 20 (COMPARATIVE)

In this test aluminium trichloride, previously purified by means of three successive sublimations, is used as a catalyst in a quantity corresponding to a butadiene-/$AlCl_3$ molar ratio of 49:1. The solvent medium consists of methylene chloride alone and the other conditions and methods of operation are those described in Example 1.

The reaction is fast and rapid evolution of heat occurs. After 2 minutes the conversion is equal to 50% and a polymer partially (60%) soluble in toluene is obtained. The soluble portion has a residual unsaturation of 41% and a softening temperature of 100° C.

EXAMPLE 21

Into a 330 ml, dark glass bottle, fitted with a magnetic agitator and a crown cap fitted with a stainless steel valve with a luer-lock connection, previously purged with repeated vacuum-nitrogen treatments, 80 ml (104g) of methylene chloride and 120 ml (84 g) of technical heptane treated as described in Example 1 are introduced with syringe.

The bottle is then placed in a thermostatically controlled bath at 23° C. and there are added, under agitation, 26.66g of butadiene (dried as in Example 1) and 2.0 ml of a solution of 0.624 g of ethylaluminium dichloride in heptane.

After 85 minutes the contents of the bottles are poured, under agitation, into a beaker containing 500 ml of methanol, in which 0.25 g of 2,6-di-tert-butyl-4-methylphenol are dissolved.

The precipitate is separated by decantation, washed with another 250 ml of methanol, filtered, dried in a vacuum oven at 60° C. for 10 hours and then weighed.

16.13 g (60.5% conversion) of a powdery white solid are obtained, completely soluble in toluene, having a residual unsaturation of 47% and a softening temperature of 140° C.

The microstructure is as follows: 1,4-cis 9%; 1,4-trans 70%; vinyl 21%.

EXAMPLES 22-26

These tests are carried out in the same way as in Example 1, the content of the water added with the heptane being varied. Test 22 was carried out without the addition of water, using reagents dehydrated as in Example 1. After this dehydration treatment the residual humidity cannot be measured by the Panameters hygrometer, mod. 100, and the water content is therefore lower than 1 ppm.

The results are recorded in Table 4.

EXAMPLES 27 AND 28

150 g of isoprene, previously dried on molecular sieves and distilled over triethylaluminium, are polymerized according to the procedure described in Example 1 and in the presence of various quantities of the ethylaluminium dichloride catalyst. The cyclized polyisoprene obtained is in the form of a powdery solid, amorphous under X-ray examination and completely soluble in toluene.

The results are recorded in Table 5.

Table 4

| Example | H$_2$O (ppm) | Time (min) | Conversion (%) |
|---|---|---|---|
| 22 | <1 | 80 | 38.2 |
| 23 | 7 | 80 | 57.7 |
| 24 | 23 | 80 | 65.1 |
| 25 | 38 | 80 | 73.9 |
| 26 | 50 | 80 | 80.6 |

Table 5

| Example | isoprene aluminium moles/moles | Time (min) | Conversion (%) | Residual unsaturation (%) | s.T. (° C) |
|---|---|---|---|---|---|
| 27 | 50 | 70 | 80.7 | 44.6 | 160 |
| 28 | 100 | 70 | 69.2 | 52 | 130 |

EXAMPLE 29

33.58 g of isoprene, dried as in Example 28, are reacted according to the procedure described in Example 21, in the presence of ethylaluminium dichloride added in a quantity corresponding to an isoprene/Et Al Cl$_2$ molar ratio of 50:1.

By interrupting the reaction after 25 minutes, 16.79 g (50.0% conversion) are obtained of a powdery white product, completely soluble in toluene and having a softening temperature of 105° C.

The residual unsaturation is 54.6% and the microstructure is as follows: 1,4-trans 93%; vinyl 5%; 3,4 2%.

EXAMPLE 30

150g of anhydrous isoprene are reacted according to the procedure of Example 1, at a temperature of 0° C.

After 120 minutes the conversion is 51.1% and the powdery white product thus obtained is completely soluble in toluene and has a softening temperature of 103° C.

EXAMPLE 31 (COMPARATIVE)

This test is carried out as in Example 27, the polymerization being interrupted after 90 minutes. The conversion is 90% and the polymer is only 40% soluble in toluene.

EXAMPLES 32-34

In these tests 150 g of anhydrous isoprene are subjected to polymerization according to the procedure described in Example 1, in the presence of variable amounts of humidity.

In all cases the resulting cyclized polyisoprenes are completely soluble in toluene.

The results of the tests are recorded in Table 6.

Table 6

| Example | H$_2$O (ppm) | Time (min) | Conversion (%) |
|---|---|---|---|
| 32 | <1 | 60 | 37.1 |
| 33 | 7 | 60 | 64.3 |
| 34 | 25 | 60 | 77.9 |

We claim:

1. A process for the preparation of cyclized polydienes devoid of crosslinked fractions, which comprises polymerizing one or more conjugated diolefins in solution in a solvent consisting of a mixture of one or more saturated aliphatic or cycloaliphatic hydrocarbons with one or more chlorinated saturated aliphatic or cycloaliphatic hydrocarbons, said chlorinated hydrocarbons being present in said solvent in an amount of from 20 to 95% by weight, in the presence of from 0.1 to 10 moles for each 100 moles of diolefins, of a catalyst of the formula $R_n$ Al Cl$_{3-n}$, where R is an alkyl radical with from 1 to 6 carbon atoms and n is from 1 to 1.5, interrupting the polymerization before the critical conversion, corresponding to the beginning of the formation of crosslinked fractions, is reached, and recovering the cyclized polydienes thus obtained from the reaction medium.

2. The process of claim 1, wherein said conjugated diolefins have from 4 to 6 carbon atoms.

3. The process of claim 1, wherein said conjugated diolefins are selected from the group consisting of butadiene and isoprene.

4. The process of claim 1, in which said diolefins are used in an amount not exceeding 8 moles for each liter of solvent.

5. The process of claim 1, in which said diolefins are used in an amount of from 1 to 4.5 moles for each liter of solvent.

6. The process of claim 1, wherein said saturated hydrocarbons have from 4 to 12 carbon atoms.

7. The process of claim 1, wherein said saturated hydrocarbons have from 5 to 8 carbon atoms.

8. The process of claim 1, wherein said chlorinated saturated hydrocarbons are selected from the group consisting of mono- and polychlorinated methane and ethane.

9. The process of claim 1, wherein said chlorinated hydrocarbons are selected from the group consisting of methyl chloride, ethyl chloride and methylene chloride.

10. The process of claim 1, wherein said solvent contains from 40 to 80% by weight of chlorinated hydrocarbons.

11. The process of claim 1, wherein said alkyl radical R contains from 2 to 4 carbon atoms.

12. The process of claim 1, wherein said catalyst is selected from the group consisting of monoethylaluminum dichloride and ethylaluminum sesquichloride.

13. The process of claim 1, wherein said catalyst is used in an amount of from 0.5 to 5 moles for each 100 moles of conjugated deiolefin.

14. The process of claim 1, in which the polymerization is carried out at a temperature of from −80° to 70° C.

15. The process of claim 1, in which the polymerization is carried out at a temperature of from 0° to 40° C.

16. The process of claim 1, in which said solvent contains from 5 to 100 ppm of polar compounds promoting the formation of protons in the presence of said catalyst.

17. The process of claim 16, wherein said polar compounds are selected from the group consisting of water, alcohols and hydrogen halides.

* * * * *